United States Patent
Nishida et al.

(10) Patent No.: US 6,532,159 B2
(45) Date of Patent: Mar. 11, 2003

(54) SWITCHING POWER SUPPLY UNIT

(75) Inventors: Akio Nishida, Kyoto (JP); Hiroshi Takemura, Muko (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/836,767

(22) Filed: Apr. 17, 2001

(65) Prior Publication Data

US 2002/0011602 A1 Jan. 31, 2002

(30) Foreign Application Priority Data

Apr. 17, 2000 (JP) ........................................ 2000-115690

(51) Int. Cl.[7] .............................................. H02M 3/335
(52) U.S. Cl. .................. 363/21.16; 363/21.14
(58) Field of Search ....................... 363/65, 19, 21.16, 363/20, 16, 17, 98, 97, 132, 21.14

(56) References Cited

U.S. PATENT DOCUMENTS

| | | | |
|---|---|---|---|
| 4,694,385 A | | 9/1987 | Marinus |
| 5,012,399 A | * | 4/1991 | Takemura et al. ............. 363/18 |
| 5,175,675 A | * | 12/1992 | Uramoto ...................... 363/19 |
| 5,412,555 A | * | 5/1995 | Uramoto ...................... 363/18 |
| 5,943,222 A | * | 8/1999 | Ogawa ........................ 363/19 |
| 5,995,382 A | * | 11/1999 | Miyazaki et al. .............. 363/19 |
| 5,995,385 A | * | 11/1999 | Shimamura ................... 363/56 |
| 6,038,143 A | | 3/2000 | Miyazaki et al. |
| 6,178,100 B1 | * | 1/2001 | Kitano ........................ 363/19 |
| 6,295,211 B1 | * | 9/2001 | Nishida et al. ................ 363/19 |

FOREIGN PATENT DOCUMENTS

| | | |
|---|---|---|
| EP | 0935333 | 2/1999 |
| EP | 0938184 | 2/1999 |
| EP | 1020980 | 1/2000 |
| JP | 9117134 | 5/1997 |
| JP | 2956681 | 7/1999 |

* cited by examiner

*Primary Examiner*—Rajnikant B. Patel
(74) *Attorney, Agent, or Firm*—Ostrolenk, Faber, Gerb & Soffen, LLP

(57) ABSTRACT

A switching power supply unit comprises: a transformer, a main switching element, a rectifying smoothing circuit, a mode switching circuit and a delay circuit. The transformer has a primary winding, a secondary winding and a bias winding. The main switching element is connected to the primary winding and receives an output of the bias winding as a positive feedback so as to form a ringing choke converter operating in self-excitation oscillation. The rectifying smoothing circuit is connected to the bias winding. The mode switching circuit is turned on and off depending on whether or not the rectifying smoothing voltage of the rectifying smoothing circuit is a threshold voltage or higher. The delay circuit is coupled to the mode switching circuit and is connected between the main switching element and the bias winding and delays the output of the bias winding and applies the delayed output to the main switching element. The delay circuit lengthens a turn-on delay time when the mode switching circuit detects an output voltage of the rectifying smoothing circuit which is less than the threshold voltage.

19 Claims, 5 Drawing Sheets

SWITCHING POWER SUPPLY UNIT

BACKGROUND OF THE INVENTION

1. Field of the Invention

The present invention relates to a switching power supply unit made up of a ringing choke converter in which a main switching element such as an oscillation transistor, etc., is connected to a primary winding of a transformer and a self-excitation oscillation takes place by positive feedback of the output from a bias winding of the transformer to the main switching element.

2. Description of the Related Art

In a ringing choke converter (hereinafter referred to as an RCC) in which a main switching element such as an oscillation transistor, etc., is connected to a primary winding of a transformer and an output is supplied to the secondary winding by self-oscillation, the oscillation frequency increases in a waiting state because of the following reason.

Because an RCC operates so that either a primary winding current or a secondary winding current may always flow, when the primary current and the secondary current are combined, the current seems to continuously flow. At a fixed load, that is, in the state of a rated load, etc., a conducting time period per unit time of the main switching element on the primary winding side is lengthened so as to be able to supply a fixed load current. However, in a waiting state in which no load or a small load is present, the electric power to be supplied to the load is extremely reduced, and accordingly the conducting time period per unit time of the main switching element is shortened so as to reduce the load current. Because of this, the switching frequency increases in a waiting state in the RCC.

On the other hand, in a general PWM switching power supply unit in which a main switching element connected to a primary winding of a transformer is made to operate as a separately excited oscillator, the oscillation frequency of the main switching element is constant regardless of whether the load is light or heavy. Then, the switching power supply unit is made to operate in a continuous current mode or in a discontinuous current mode in accordance with the condition of the load by controlling the pulse width. That is, the switching power supply unit is operated in a continuous current mode when the load is a fixed or variable load, and in a waiting state, the switching power supply unit is operated in a discontinuous current mode in which the current is made discontinuous by narrowing the pulse width in order to reduce the electric power to be supplied to the load.

However, in a switching power supply unit in which self-oscillation takes place, such as an RCC, there is a problem of decreasing efficiency because the oscillation frequency increases in a waiting state, and also in a switching power supply unit of a general PWM type having separate excitation oscillation, there is a problem of the decreasing efficiency in a waiting state as in the above RCC because the oscillation frequency is constant regardless of load size. Moreover, switching power supply units are disclosed in Japanese Unexamined Patent Application Publication No. 9-117134 and Japanese Patent No. 2956681. In these, the oscillation frequency is lowered by detecting the lowered power supply voltage of a control IC in a waiting state and the oscillation frequency is decreased by detecting the output lowered by an external signal in a waiting state, but both of these designs are based on a separate excitation oscillation. Accordingly the dissipation power of an IC and circuit for controlling the main switching element cannot be neglected, and particularly the dissipation power in a waiting state becomes large and not negligible and a substantial improvement of efficiency cannot be expected with these designs.

SUMMARY OF THE INVENTION

It is an object of the present invention to improve the efficiency in an RCC type switching power supply unit by lowering the oscillation frequency in a waiting state.

According to the invention, switching power supply unit comprises: a transformer, a main switching element, a rectifying smoothing circuit, a mode switching circuit and a delay circuit. The transformer has a primary winding, a secondary winding and a bias winding. The main switching element is connected to the primary winding and receives an output of the bias winding as a positive feedback so as to form a ringing choke converter having a self-excitation oscillation. The rectifying smoothing circuit is connected to the bias winding. The mode switching circuit is turned on and off depending on whether the rectifying smoothing voltage of the rectifying smoothing circuit is a threshold voltage or higher. The delay circuit is coupled to the mode switching circuit and is connected between the main switching element and the bias winding and delays the output of the bias winding and applies the delayed output to the main switching element. The delay circuit lengthens a turn-on delay time when the mode switching circuit detects an output voltage of the rectifying smoothing circuit which is less than the threshold voltage. The degree of coupling in the transformer may be adjusted so that the smoothing output voltage may be made less than a threshold voltage by cross regulation of the transformer when the load power equals a threshold level or less.

The switching power supply unit may have a plurality of winding outputs on the side of a secondary winding and the outputs may be connected.

Alternatively, an output voltage switching circuit for switching output voltages on the side of a secondary winding of a transformer may be provided.

According to the present invention, without using control ICs and complicated circuits for separate excitation oscillation, the oscillation frequency automatically decreases by making use of cross regulation of a transformer itself in a waiting state, and accordingly loss can be suppressed and by that much, the efficiency can be increased. Furthermore, dissipation power can be easily decreased in a waiting state by providing the secondary winding of a transformer with a switch.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

BRIEF DESCRIPTION OF THE DRAWING(S)

DETAILED DESCRIPTION OF EMBODIMENTS OF THE INVENTION

Figure 1:
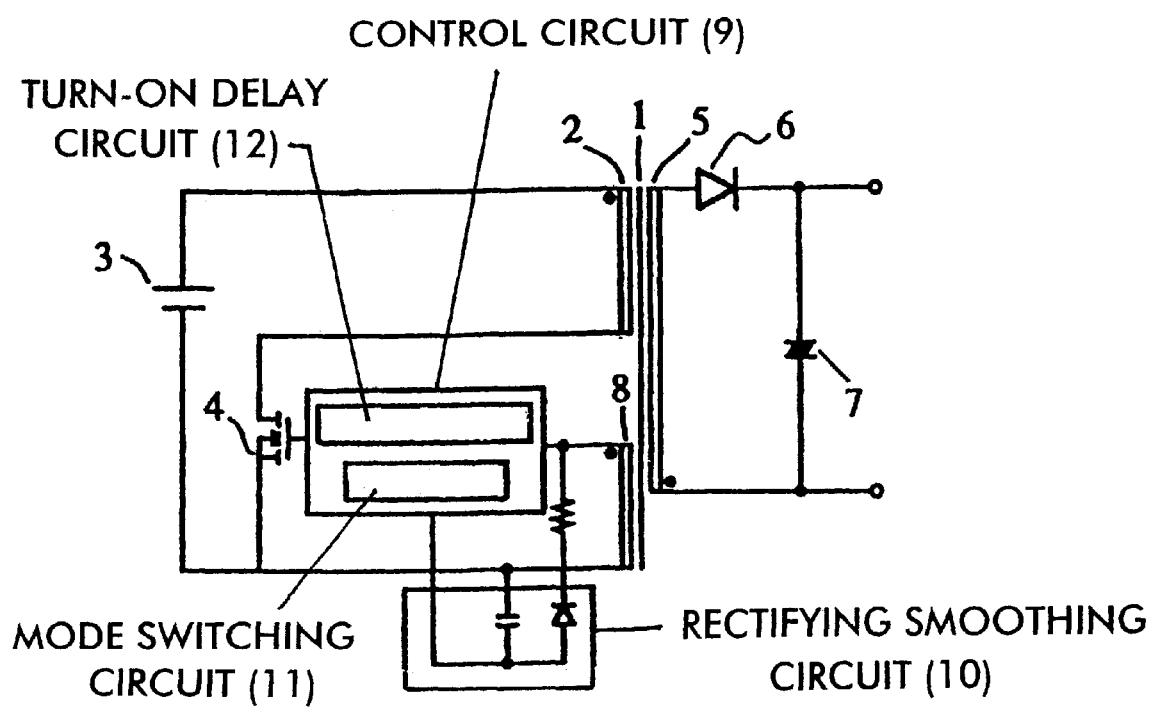
FIG. 1 shows an example of the construction of an RCC type switching power supply unit of the present invention.

FIG. 1 shows a general example of the construction of a switching power supply unit of the present invention.

The switching power supply unit comprises a ringing choke converter. More specifically, a power supply 3 and a MOSFET 4 as a main switching element are connected to a primary winding 2 of a transformer 1. Furthermore, a diode 6 and a capacitor 7 are connected to a secondary winding 5, and an output voltage is taken across the capacitor 7. Moreover, the transformer 1 is provided with a bias winding 8 and the output of this bias winding 8 is input into the gate as a control terminal of a MOSFET 4 through a control circuit 9, thereby causing a self-oscillation.

In the present invention, a rectifying smoothing circuit 10 is connected to the bias winding and the control circuit 9 is made up of a mode switching circuit 11 and a turn-on delay circuit 12.

The above rectifying smoothing circuit 10 rectifies and smoothes the output voltage from the bias winding 8 and outputs it to the mode switching circuit 11. When the rectifying smoothing output voltage of the rectifying smoothing circuit 8 is a certain voltage or higher, the mode switching circuit 11 is turned on to set a continuous current mode. Furthermore, when the rectifying smoothing voltage is less than the certain voltage, the mode switching circuit 11 is turned off to set a discontinuous current mode. The turn-on delay circuit 12 is to determine a voltage delay time between the output of the bias winding 8 and the gate of the MOSFET 4, and when a continuous current mode is set by the mode switching circuit 11 the output of the bias winding 8 is hardly delayed, and when a discontinuous current mode is set the output of the bias winding 8 is delayed for a fixed time. Because of this, when a rectifying smoothing voltage of the rectifying smoothing circuit 10 is small, that is, when the transformer is in a waiting state, a discontinuous current mode is set and the oscillation frequency of the MOSFET 4 is lowered.

When an ideal transformer is used as transformer 1, the output voltage of each of windings becomes proportional to its turn ratio in the transformer, but in an actual transformer the output voltages are affected by leakage inductance, etc., of the transformer. In particular, when a winding is heavily loaded and another winding is lightly loaded, the output voltage of the winding at a light load provides a lower output voltage than the voltage as determined by the turn ratio. Here, in the construction of FIG. 1, although the rectifying smoothing circuit 10 provided for the bias winding 8 on the primary winding side is always lightly loaded, the electric power to be supplied to the load of the secondary winding 5 changes from a light load to a heavy load, and accordingly, when the secondary winding is heavily loaded, the absolute value of the voltage of the rectifying smoothing circuit 10 provided for the bias winding 8 increases, and on the contrary when the secondary winding is lightly loaded, the absolute value of the voltage of the rectifying smoothing circuit 10 decreases. Such an action in the transformer 1 is called cross regulation of a transformer. In the present invention, such an action of cross regulation of the transformer is used, and when the secondary winding is lightly loaded (in a waiting state) the oscillation frequency of a MOSFET 4 on the side of the primary winding is made to automatically decreases.

That is, when the switching power supply unit is in a waiting state, the output voltage of the bias winding 8 decreases to be less than a voltage determined by the turn ratio, and accordingly the rectifying smoothing voltage of the rectifying smoothing circuit 10 decreases and the mode switching circuit 11 detects the decrease and sets a continuous current mode. Then, because the turn-on delay circuit 12 sets a long delay time, the oscillation frequency of the MOSFET 4 decreases.

In an RCC type switching power supply unit as is shown in FIG. 1, because the oscillation frequency automatically decreases in a waiting state, losses can be suppressed and the efficiency can be increased accordingly. Furthermore, because control ICs and complicated circuits for separate excitation oscillation are not required, power consumption in the control circuit 9 is low even in the above-mentioned waiting state. Because of this, the efficiency in a waiting state is improved.

As will be explained in detail hereinafter, a secondary winding of the transformer may contain a plurality of winding outputs and a switch is provided between winding outputs. By connecting a plurality of winding outputs by the above switch, the potential of a low-voltage output becomes equal to that of a high-voltage output between a plurality of winding outputs. In this way, the output voltage of the bias winding decreases in accordance with the turn ratio of the transformer. The operation after a plurality of winding outputs have been connected between them is the same as that explained above. That is, when the switching power supply unit is set in a waiting state, the output of the bias winding decreases and the rectifying smoothing voltage also decreases to turn into a discontinuous mode. Because of this, the oscillation frequency of the main switching element decreases. Moreover, the switch can be provided on the load side without providing the power supply circuit with the switch.

Alternatively, an output voltage changing switch for changing output voltages on the side of the secondary winding of the transformer may be provided. The secondary winding side output voltage is lowered by turning on the output voltage changing switch, and the operation where the oscillation frequency of the main switching element on the side of the primary winding is lowered in the same way. Furthermore, this output voltage changing switch can be also provided on the load side.

Hereinafter, more specific example of the present invention will be explained.

Figure 2:
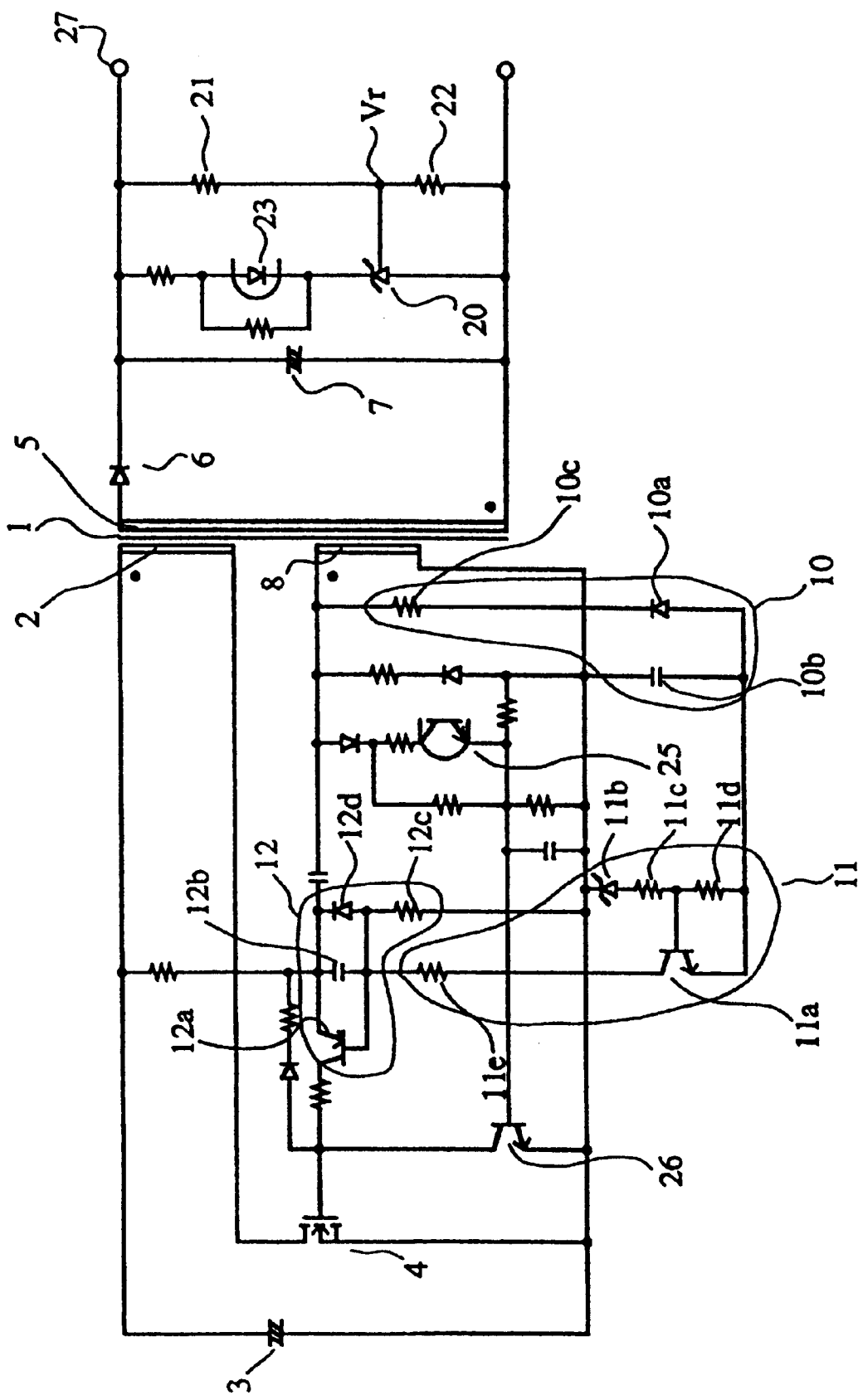
FIG. 2 is a circuit diagram of an RCC type switching power supply unit of a first embodiment of the present invention.

FIG. 2 shows a circuit diagram of a RCC type switching power supply unit of a first embodiment of the present invention. Moreover, regarding the reference numerals, the same portions as shown in FIG. 1 are given the same reference numerals.

An output voltage detecting circuit including a shunted regulator 20 and voltage divider resistors 21 and 22 is connected to a secondary winding 5 of a transformer 1, and a photodiode 23 is connected in series to the shunted regulator 20. The shunted regulator 20 controls the current between the cathode and the anode so that the voltage of a reference voltage input terminal Vr is kept constant. The change of the current is converted into the intensity of light from the photodiode 23, and the light is input into a phototransistor 25 connected to a bias winding 8 on the side of a primary winding of the transformer 1. A transistor 26 is connected to the emitter of the phototransistor 25, and the collector of the transistor 26 is connected to the gate of a MOSFET 4. In this circuit, a turn-on timing of the transistor 26 is controlled by the amount of current flowing the photodiode 23, through the phototransistor 25, and, as a result, an On-state period of the MOSEFT 4 is controlled. That is, when the output voltage becomes high and the current of the photodiode 23 is about to increase, the On-state period of the MOSEFT 4 is shortened and functions so as to decrease the output voltage, and, on the contrary, when the output voltage becomes low and the current flowing through the photodiode 23 is about to decrease, the On-state period is lengthened and functions so as to increase the output voltage. Because of such operation, the output voltage is stabilized.

In this power supply unit, in addition to the above circuit, a rectifying smoothing circuit 10, a mode switching circuit 11 and turn-on delay circuit 12 are provided as is shown in FIG. 1.

The rectifying smoothing circuit 10 is made up of a diode 10a, a capacitor 10b, and a resistor 10c, and the output voltage from the bias winding 8 is rectified by diode 10a and smoothed by the capacitor 10b. The transformer 1 contains leakage inductance and the rectifying smoothing circuit 10 is extremely lightly loaded, and accordingly because of cross regulation, when the side of the secondary winding is lightly loaded, the output voltage of the bias winding 8 becomes less than a voltage determined by the turn ratio. Thus, the charging voltage (rectifying smoothing voltage) of the capacitor 10b is high when the secondary winding is heavily loaded, and, on the other hand, the charging voltage of the capacitor 10b is low when the second winding is lightly loaded.

The mode switching circuit 11 is made up of a transistor 11a, a Zener diode 11b, resistors 11c, 11d, and 11e, and the Zener diode 11b and the resistors 11c and 11d detect whether or not a rectifying smoothing voltage of the above capacitor 10b is a fixed voltage or higher. When the rectifying smoothing voltage is a fixed voltage or higher, a current flows through the Zener diode 11b and the transistor 11a is turned on. The values of the Zener diode 11b and the resistors 11c and 11d are set so that when the rectifying smoothing voltage of the capacitor 10b is a voltage corresponding to a waiting state, the transistor 11a is turned off and when the capacitor 10b is in a rated load state, etc., in which the capacitor 10b is loaded as much as or more than the above, the transistor 11a is turned on. Moreover, here, the waiting state means that the load connected to the secondary winding of the transformer 1 is a fixed light load. For example, when a facsimile device is connected to the secondary winding, a reception waiting state means a waiting state, and a transmission operating state in which a motor, etc., is in operation, means a rated load state.

The turn-on delay circuit 12 is made up of a transistor 12a, the collector and emitter of which are connected to the MOSFET 4 and the bias winding 8 respectively, a capacitor 12b and a diode 12d connected between the emitter and the base of the MOSFET 4, and a resistor 12c connected between the gate of the MOSFET 4 and a reference voltage (ground).

When the transistor 11a in the mode switching circuit 11 is turned on, the voltage of the capacitor 10b is applied to the base of the transistor 12a in the turn-on delay circuit 12 through the resistor 11e. At this time, the transistor 12a is turned on so that the voltage of the bias winding 8 is input to the MOSFET 4 without almost any delay after the voltage has been applied to the transistor 12a. That is, in the rated load state, a rectifying smoothing voltage of the rectifying smoothing circuit 10 is made a fixed voltage or higher, and accordingly the transistor 11a in the mode switching circuit 11 is turned on and, because of this, the transistor 12a in the turn-on delay circuit 12 provides the output voltage of the bias winding 8 to the MOSFET 4 without almost any delay. In this way, the MOSFET 4 operates in a continuous current mode.

On the other hand, in a waiting state in which the voltage of the capacitor 10b is low, the transistor 11a in the mode switching circuit 11 is in the OFF-state. At this time, the transistor 12a in the turn-on delay circuit 12 is turned on so that the voltage of the bias winding 8 is input into the MOSFET 4 at a fixed delay time after the voltage has been applied to the transistor 12a. This turn-on delay time is determined by a time constant of an RC circuit made up of the capacitor 12b and the resistor 12c. That is, in a waiting state, because the rectifying smoothing voltage of the rectifying smoothing circuit 10 becomes less than a fixed voltage, the transistor 11a in the mode switching circuit 11 is turned off, and, because of this, the transistor 12a in the turn-on delay circuit 12 provides the output voltage of the bias winding 8 to the MOSFET 4 after a fixed delay time. As a result, the operation of the MOSFET 4 becomes a discontinuous current mode and the oscillation frequency decreases to a fixed frequency.

In this way, the mode switching circuit 11 sets the operation of the MOSFET 4 in a discontinuous current mode at the time in a waiting state and sets the operation of the MOSFET 4 in a continuous current mode at a rated load state.

As described above, in this embodiment, the rectifying smoothing circuit 10 automatically detects a rated load state or a waiting state by making use of cross regulation of the transformer 1 and can automatically decrease the oscillation frequency of the MOSFET 4 at the time in a waiting state to reduce the loss. Moreover, because the dissipation power of the transistor 11a in the mode switching circuit 11 becomes almost zero in a waiting state, the loss of the primary winding side can be further reduced and a higher efficiency can be realized.

Figure 3:
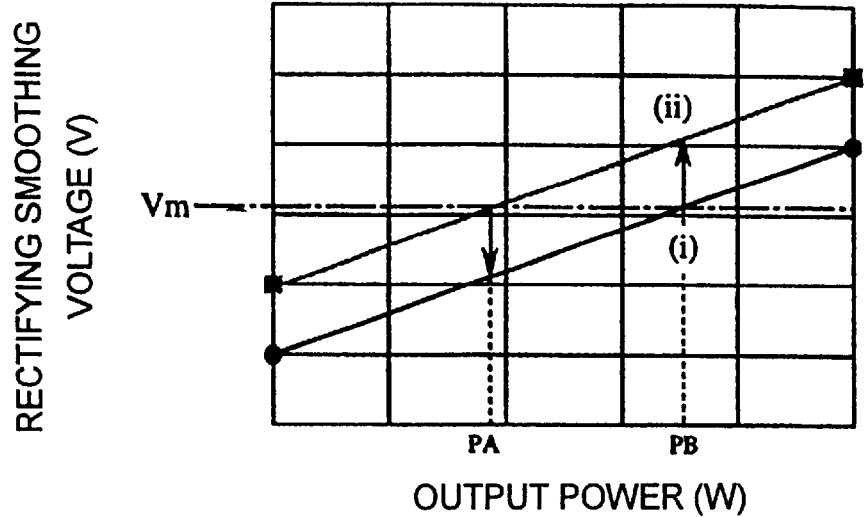
FIG. 3 shows the characteristic of a rectifying smoothing voltage to an output power.
Figure 4:
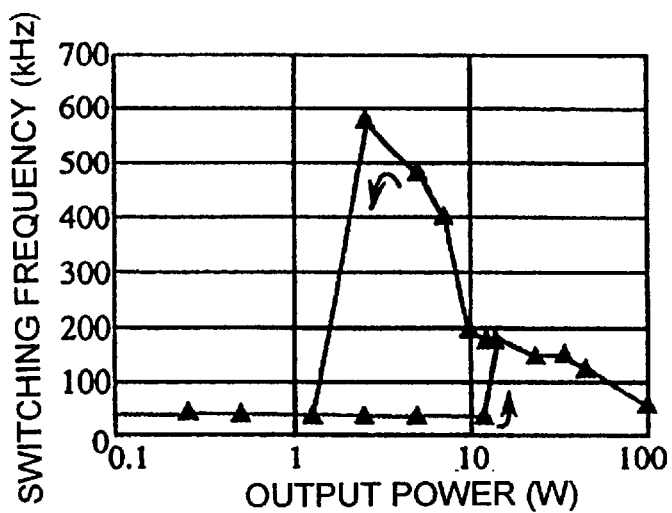
FIG. 4 shows the characteristic of a switching frequency to an output power.
Figure 5:
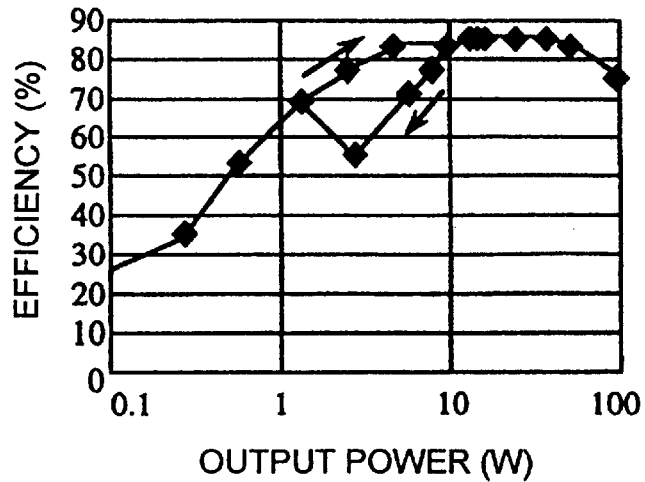
FIG. 5 shows the characteristic of an efficiency to an output power.

Moreover, the change of a rectifying smoothing voltage of the capacitor 10b to an output power is shown in FIG. 3. (i) in the drawing shows a discontinuous current mode and (ii) shows a continuous current mode. Furthermore, FIG. 4 shows the switching frequency (oscillation frequency) of the MOSFET 4 related to output power, and FIG. 5 shows the efficiency related to output power. Moreover, as are shown in FIGS. 3 to 5, the rectifying smoothing voltage characteristic, the switching frequency characteristic, and the efficiency characteristic contain a hysteresis loop. The reason is that although the mode switching voltages Vm are nearly constant, the rectifying voltages are different between a continuous current mode and a discontinuous current mode as shown in FIG. 3. In FIG. 3, the time when a discontinuous current mode changes to a continuous current mode is at PB in output power, and the time when a continuous current mode changes to a discontinuous current mode is at PA in output power.

Figure 6:
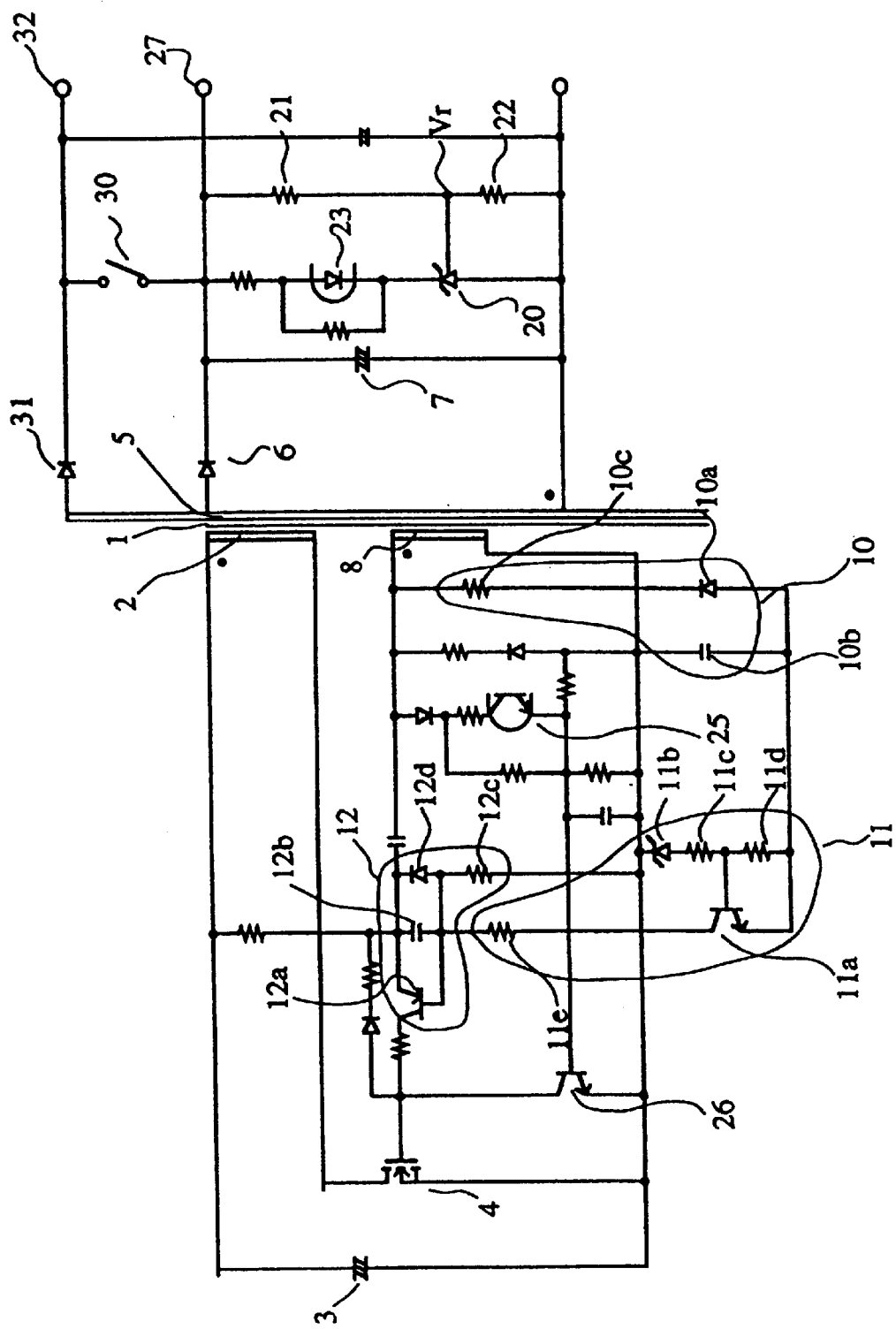
FIG. 6 is a circuit diagram of an RCC type switching power supply unit of a second embodiment of the present invention.

FIG. 6 shows a second embodiment of the present invention. In the RCC type switching power supply unit of this embodiment, a second winding output voltage is made available by increasing the number of windings of the secondary winding 5 of the transformer 1. This voltage is rectified by a diode 31 and is output as a second output voltage from a terminal 32. A switch 30 is connected between a terminal 27 and the terminal 32, and both terminals can be connected or disconnected by turning the switch 30 on or off. When the switch 30 is turned off, a high voltage at the terminal 27 is output to the output terminal 32. Here, the output voltage from the output terminal 27 is stabilized by a voltage stabilizer. Therefore, when the switch 30 is turned on, the output voltage from the output terminal 32 becomes the output voltage from the output terminal 27. As a result, in accordance with the turn ratio of the transformer 1, the output voltage of the bias winding 8 decreases. When the output voltage from the bias winding 8 decreases, the rectifying smoothing voltage of a rectifying smoothing circuit 10 also decreases, and accordingly a transformer 11a of a mode switching circuit 11 is turned off and the operation of a MOSFET 4 is set to a discontinuous current mode.

In this switching power supply unit, the output from the output terminal 32 is supplied to a heavy load such as a motor, etc., and the output from the output terminal 27 is supplied to a light load such as a control circuit, etc. power is supplied only to a control circuit 2 in a waiting state and power is not supplied to a driving circuit having a heavy load for a motor, etc. Accordingly, the switch 30 is turned on in a waiting state. In this way, in a waiting state, a power can be supplied only to the control circuit in a discontinuous current mode and when a motor, etc. are driven as a heavy load, power can be supplied to this motor, etc., in a continuous current mode by turning the switch off.

Figure 7:
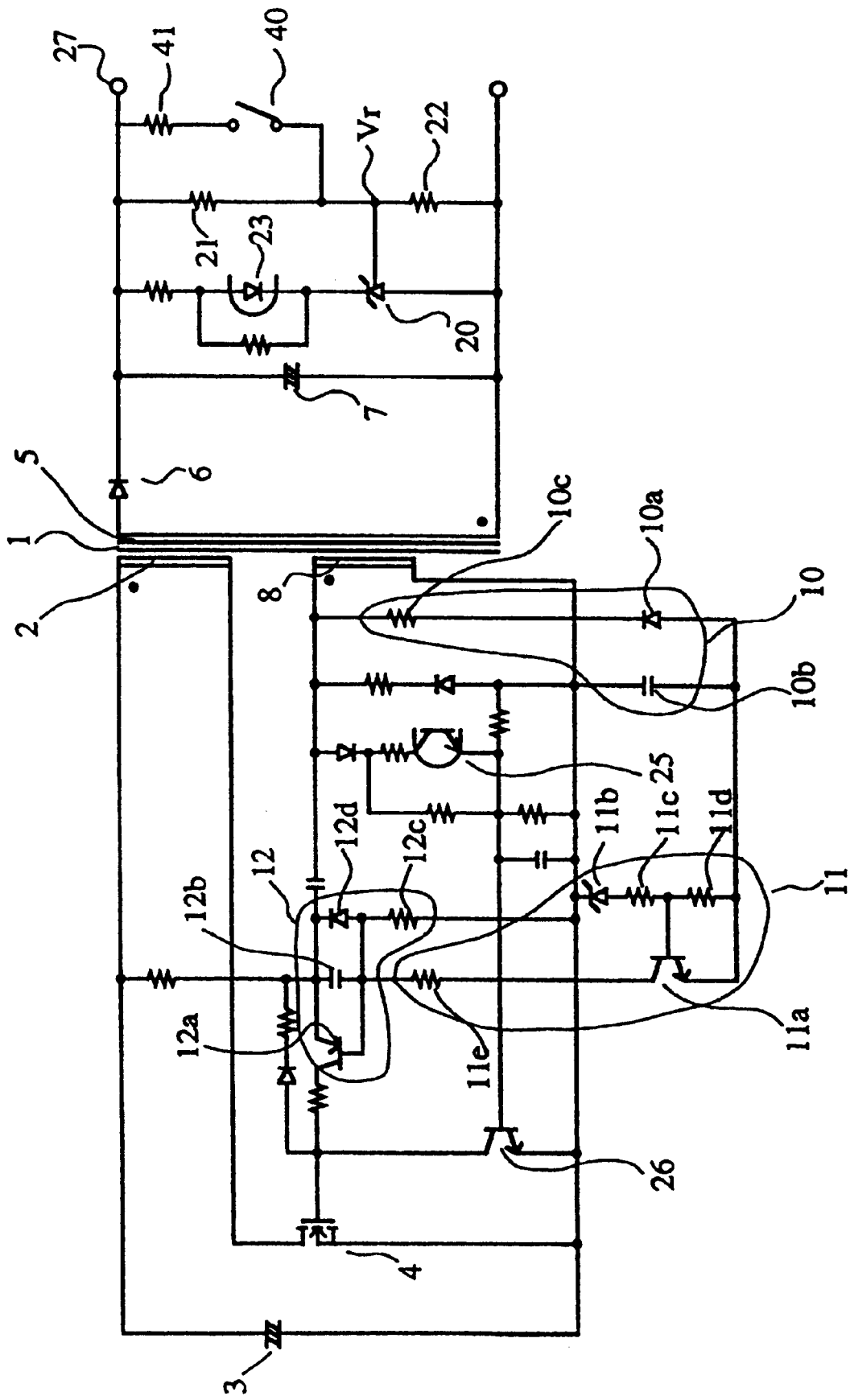
FIG. 7 is a circuit diagram of an RCC type switching power supply unit of a third embodiment of the present invention.

FIG. 7 shows a third embodiment of the present invention. In the RCC type switching power supply unit of this embodiment, a series circuit of a resistor 41 and a switch 40 is connected in parallel to a resistor 21 in an output voltage detection circuit. Because the voltage of a reference voltage input terminal Vr of a shunted regulator 20 in the voltage detection circuit is controlled so as to be constant, when the combined resistance between the terminal Vr and the output terminal 27 is lowered by turning the switch 40 on, the output voltage of the output terminal 27 decreases. In this way, when the output voltage on the side of the secondary winding decreases, the operation of the MOSFET 4 on the side of the primary winding goes into a discontinuous current mode and the oscillation frequency decreases in the same way as in the above first and second embodiments.

In the RCC switching power supply unit shown in FIG. 7, the output voltage of the output terminal 27 on the secondary winding side is set to be a driving voltage for a motor, etc., having a heavy load and this voltage is supplied to the motor, etc., and at the same time the voltage is reduced to 5V, etc., by using a voltage-regulator circuit, etc., and is supplied to a control circuit, etc. When the switch 40 is turned on, the output voltage is reduced and a motor, etc., having a heavy load cannot be driven, but because the output voltage is stabilized so as to be 5 V, etc., by the voltage regulator circuit, the voltage comes to be stably supplied to the control circuit. In the circuit construction shown in FIG. 7, when it is compared with the power supply unit of FIG. 6, the construction of the transformer 1 is simpler, and because the diode 31, etc., in FIG. 6 are not required, there is an advantage that the construction of the whole power supply unit becomes simpler, but if a voltage drop does not occur in a waiting state, the voltage regulator circuit, etc., becomes necessary on the output side, as described above.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A switching power supply unit comprising:

a transformer having a primary winding, a secondary winding and a bias winding;

a main switching element connected to the primary winding, the main switching element receiving an output of the bias winding as a feedback signal so as to operate in self-excitation oscillation;

a rectifying smoothing circuit connected to the bias winding;

a mode switching circuit to be turned on and off depending on an output voltage of the rectifying smoothing circuit; and a delay circuit coupled to the mode switching circuit and connected between the main switching element and the bias winding and delaying the output of the bias winding and applying the delayed output to the main switching element, the delay circuit lengthening a turn-on delay time when the mode switching circuit detects an output voltage of the rectifying smoothing circuit which has a predefined relationship to a threshold voltage.

2. The switching power supply unit of claim 1, wherein the switching power supply unit comprises a ringing choke converter, the feedback signal is a positive feedback signal and the delay circuit lengthens the turn-on delay time when the mode switching circuit detects an output voltage of the rectifying smoothing circuit that is less than the threshold voltage.

3. The switching power supply unit of claim 2, wherein a degree of coupling of the transformer is adjusted so that the output voltage of the rectifying smoothing circuit may be made less than the threshold voltage by cross regulation of the transformer when the load power is a load power threshold level or less.

4. The switching power supply unit of claim 2, wherein a plurality of winding outputs are made available on a secondary winding side of the transformer and circuits connected between the outputs are provided.

5. The switching power supply unit of claim 2, wherein an output voltage switching circuit for switching output voltages on a secondary winding side of the transformer is provided.

6. The switching power supply unit of claim 4, wherein an output voltage switching circuit for switching output voltages on a secondary winding side of the transformer is provided.

7. The switching power supply unit of claim 5, wherein the output voltage switching circuit is coupled between secondary winding outputs of the transformer.

8. The switching power supply unit of claim 5, wherein the output voltage switching circuit is coupled across a resistor of a resistor voltage divider functioning as part of an output voltage detecting circuit.

9. The switching power supply unit of claim 6, wherein the output voltage switching circuit is coupled between secondary winding outputs of the transformer.

10. The switching power supply unit of claim 6, wherein the output voltage switching circuit is coupled across a resistor of a resistor voltage divider functioning as part of an output voltage detecting circuit.

11. A switching power supply unit comprising:

a transformer having a primary winding, a secondary winding and a bias winding;

a main switching element connected to the primary winding, the main switching element receiving an output of the bias winding as a positive feedback so as to form a ringing choke converter operating in self-excitation oscillation;

a rectifying smoothing circuit connected to the bias winding;

a mode switching circuit to be turned on and off depending on whether a rectifying smoothing voltage of the rectifying smoothing circuit is a threshold voltage or higher; and a delay circuit coupled to the mode switching circuit and connected between the main switching element and the bias winding and delaying the output of the bias winding and applying the delayed output to the main switching element, the delay circuit lengthening a turn-on delay time when the mode switching circuit detects an output voltage of the rectifying smoothing circuit which is less than the threshold voltage.

12. The switching power supply unit of claim 11, wherein a degree of coupling of the transformer is adjusted so that the output voltage of the rectifying smoothing circuit may be made less than the threshold voltage by cross regulation of the transformer when the load power is a load power threshold level or less.

13. The switching power supply unit of claim 11, wherein a plurality of winding outputs are made available on a secondary winding side of the transformer and circuits connected between the outputs are provided.

14. The switching power supply unit of claim 11, wherein an output voltage switching circuit for switching output voltages on a secondary winding side of the transformer is provided.

15. The switching power supply unit of claim 13, wherein an output voltage switching circuit for switching output voltages on a secondary winding side of the transformer is provided.

16. The switching power supply unit of claim 14, wherein the output voltage switching circuit is coupled between secondary winding outputs of the transformer.

17. The switching power supply unit of claim 14, wherein the output voltage switching circuit is coupled across a resistor of a resistor voltage divider functioning as part of an output voltage detecting circuit.

18. The switching power supply unit of claim 1, wherein said mode switching circuit has a ON state in which said output of said bias winding is not substantially delayed, and an OFF state in which said output of said bias winding is delayed by a predetermined delay time.

19. The switching power supply unit of claim 11, wherein said mode switching circuit has a ON state in which said output of said bias winding is not substantially delayed, and an OFF state in which said output of said bias winding is delayed by a predetermined delay time.

* * * * *